United States Patent
D'Souza et al.

(10) Patent No.: US 12,435,900 B2
(45) Date of Patent: Oct. 7, 2025

(54) CONTROL OF DISCHARGE DEWPOINT FOR PACKAGED TERMINAL AIR CONDITIONER

(71) Applicant: Haier US Appliance Solutions, Inc., Wilmington, DE (US)

(72) Inventors: Bryan Isaac D'Souza, Louisville, KY (US); Timothy Scott Shaffer, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 147 days.

(21) Appl. No.: 18/484,948

(22) Filed: Oct. 11, 2023

(65) Prior Publication Data

US 2025/0123017 A1 Apr. 17, 2025

(51) Int. Cl.
| F24F 11/76 | (2018.01) |
| F24F 11/77 | (2018.01) |
| F24F 11/84 | (2018.01) |
| F24F 110/10 | (2018.01) |
| F24F 110/20 | (2018.01) |

(52) U.S. Cl.
CPC .............. *F24F 11/76* (2018.01); *F24F 11/77* (2018.01); *F24F 11/84* (2018.01); *F24F 2110/10* (2018.01); *F24F 2110/20* (2018.01)

(58) Field of Classification Search
CPC .. F24F 11/76; F24F 11/77; F24F 11/84; F24F 2110/10
See application file for complete search history.

(56) References Cited

U.S. PATENT DOCUMENTS

| 10,495,341 | B2 * | 12/2019 | Hashino | F24F 11/77 |
| 11,655,991 | B2 | 5/2023 | Kim et al. | |
| 12,253,272 | B1 * | 3/2025 | Jaber | F24F 11/77 |
| 2013/0055744 | A1 * | 3/2013 | Travers | F25D 17/042 62/186 |
| 2015/0160609 | A1 * | 6/2015 | Seong | G03G 21/206 399/44 |
| 2019/0234650 | A1 * | 8/2019 | D'Souza | F24F 13/22 |
| 2020/0132319 | A1 * | 4/2020 | Kim | F24F 1/00075 |
| 2020/0378637 | A1 * | 12/2020 | Xi | F24F 11/77 |
| 2021/0207858 | A1 * | 7/2021 | D'Souza | F24F 11/42 |
| 2021/0310684 | A1 * | 10/2021 | Sasaki | F24F 11/63 |
| 2023/0073117 | A1 * | 3/2023 | Longenecker | F24D 15/04 |
| 2023/0258349 | A1 * | 8/2023 | Ikari | F24F 11/62 700/276 |
| 2024/0183593 | A1 * | 6/2024 | Kim | F25B 41/40 |

FOREIGN PATENT DOCUMENTS

| AU | 2011100169 A4 | 3/2011 | |
| JP | 2019163920 A * | 9/2019 | ......... F24F 11/0008 |
| JP | 6986377 B2 | 12/2021 | |
| WO | WO2021080191 A1 | 4/2021 | |

* cited by examiner

*Primary Examiner* — Nelson J Nieves
(74) *Attorney, Agent, or Firm* — Dority & Manning, P.A.

(57) ABSTRACT

A packaged terminal air conditioner unit includes discharge air temperature and humidity sensors in the discharge air stream. Input from the sensors is used to determine the dewpoint temperature of a mixture of outside air and recirculated room air prior to discharge to the conditioned space. The air conditioner unit modifies one or more of indoor fan speed, compressor speed, and an electronically controlled expansion device to adjust the discharge air dewpoint temperature to a predetermined target value.

18 Claims, 8 Drawing Sheets

CONTROL OF DISCHARGE DEWPOINT FOR PACKAGED TERMINAL AIR CONDITIONER

FIELD OF THE INVENTION

The present disclosure relates generally to air conditioner units, in particular air conditioner units having a fresh air make-up capability.

BACKGROUND OF THE INVENTION

Air conditioners or air conditioner units are conventionally utilized to adjust the temperature in an indoor space, e.g., within structures such as dwellings and office buildings. Such units commonly include a closed refrigeration loop to heat or cool the indoor air. Typically, the air conditioner unit cycles to an "on" condition when the indoor air temperature is outside of a prescribed range and cycles to an "off" cycle when the temperature in the conditioned space reaches a prescribed temperature. Generally, the indoor air is recirculated while being conditioned during an "on" cycle. A variety of sizes and configurations are available for such air conditioner units. For example, some units may have one portion installed within the indoor space that is connected to another portion located outdoors, e.g., by tubing or conduit carrying refrigerant.

Another type of air conditioner unit, commonly referred to as packaged terminal air conditioners (PTAC), may be utilized to adjust the temperature in, for example, a single room or group of rooms, or conditioned spaces, of a structure. These units typically operate like split heat pump systems, with the indoor and outdoor portions defined by a bulkhead and all system components are housed within a single package that is installed in a wall sleeve positioned within an opening of an exterior wall of a building.

In some applications, PTACs may be required to continuously draw outdoor make-up air through the outdoor portion and into the indoor portion to provide fresh air ventilation to the indoor space. Accordingly, some PTACs allow for the introduction of outdoor make-up air into the indoor space, e.g., through a vent aperture defined in the bulkhead that separates the indoor and outdoor sides of the unit. The make-up air may be provided during off cycles of the air conditioner unit. Generally, such PTACs combine the outside make-up air with the recirculating conditioned indoor air and provide the combined air to the conditioned space.

Under some conditions, the outside air may introduce unwanted humidity to the conditioned space, leading to an uncomfortable indoor atmosphere. To address the potentially humid make-up air, some PTACs continuously operate a refrigeration loop, either a standalone unit or the main refrigeration loop for cooling the indoor air, when make-up air is provided. However, these known solutions to humid make-up air may require additional mechanical components and increase electrical consumption. Further, known solutions do not monitor the state of the combined air delivered to the conditioned space and do not modify the conditioning process to adjust temperature and humidity of the combined air supplied to a desired level. Accordingly, improvements to monitoring and processing of conditioned air supplied to a space may be beneficial.

BRIEF DESCRIPTION OF THE INVENTION

Aspects and advantages of the invention will be set forth in part in the following description, may be apparent from the description, or may be learned through practice of the invention.

In one exemplary aspect, an air conditioning unit is presented. The unit comprises a refrigeration loop comprising an evaporator and a condenser, a compressor operably coupled to the refrigeration loop and being configured to urge refrigerant through the refrigeration loop, an expansion device fluidly coupled to the refrigeration loop, an indoor fan operable to urge a flow of indoor air over the evaporator, an auxiliary fan operable to urge a flow of outdoor air to combine with the flow of indoor air to produce a mixed airflow, and a controller. The controller is operably coupled to the compressor, the expansion device, the indoor fan, and the auxiliary fan and configured to operate the compressor at a first compressor speed, operate the indoor fan at a first fan speed, and operate the auxiliary fan at a first auxiliary fan speed. The controller is further configured to determine a dewpoint temperature of the mixed airflow, determine that the dewpoint temperature of the mixed airflow is greater than a predetermined limit, and implement a responsive action in response to determining that the dewpoint temperature of the mixed airflow exceeded the predetermined limit.

In another exemplary aspect, a method of operating an air conditioner is presented. The air conditioned comprises an evaporator, a condenser, a compressor configured to urge refrigerant through the refrigeration loop, an expansion device, an indoor fan operable to urge a flow of indoor air over the evaporator, and an auxiliary fan operable to urge a flow of outdoor air to combine with the flow of indoor air to produce a mixed airflow. The method comprises operating the compressor at a first compressor speed, operating the indoor fan at a first fan speed, operating the auxiliary fan at a first auxiliary fan speed, determining a dewpoint temperature of the mixed airflow, determining that the dewpoint temperature of the mixed airflow is greater than a predetermined limit, and implementing a responsive action in response to determining that the dewpoint temperature of the mixed airflow exceeded the predetermined limit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
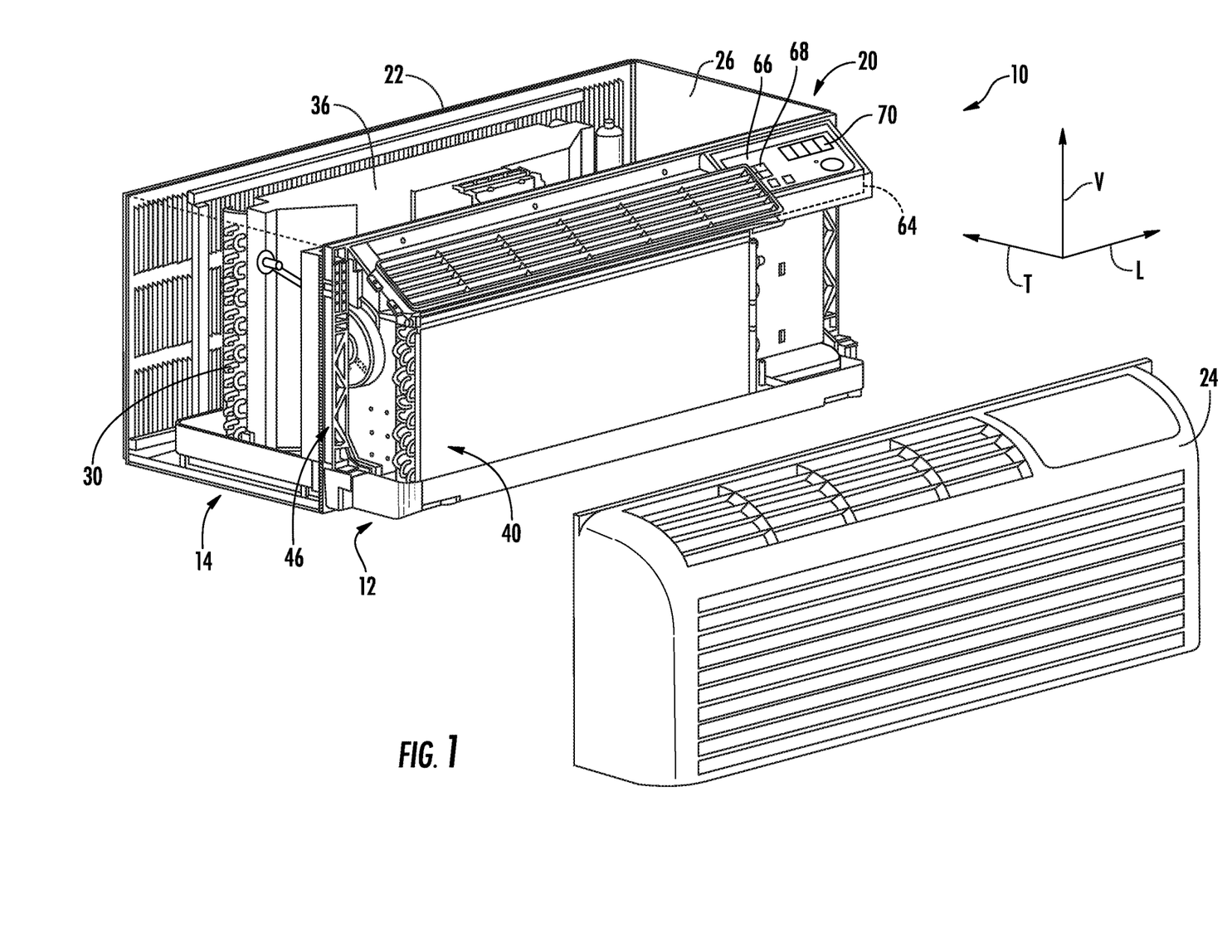
FIG. 1 provides a perspective view of an air conditioner unit in partial exploded view in accordance with an exemplary embodiment of the present disclosure.
Figure 2:
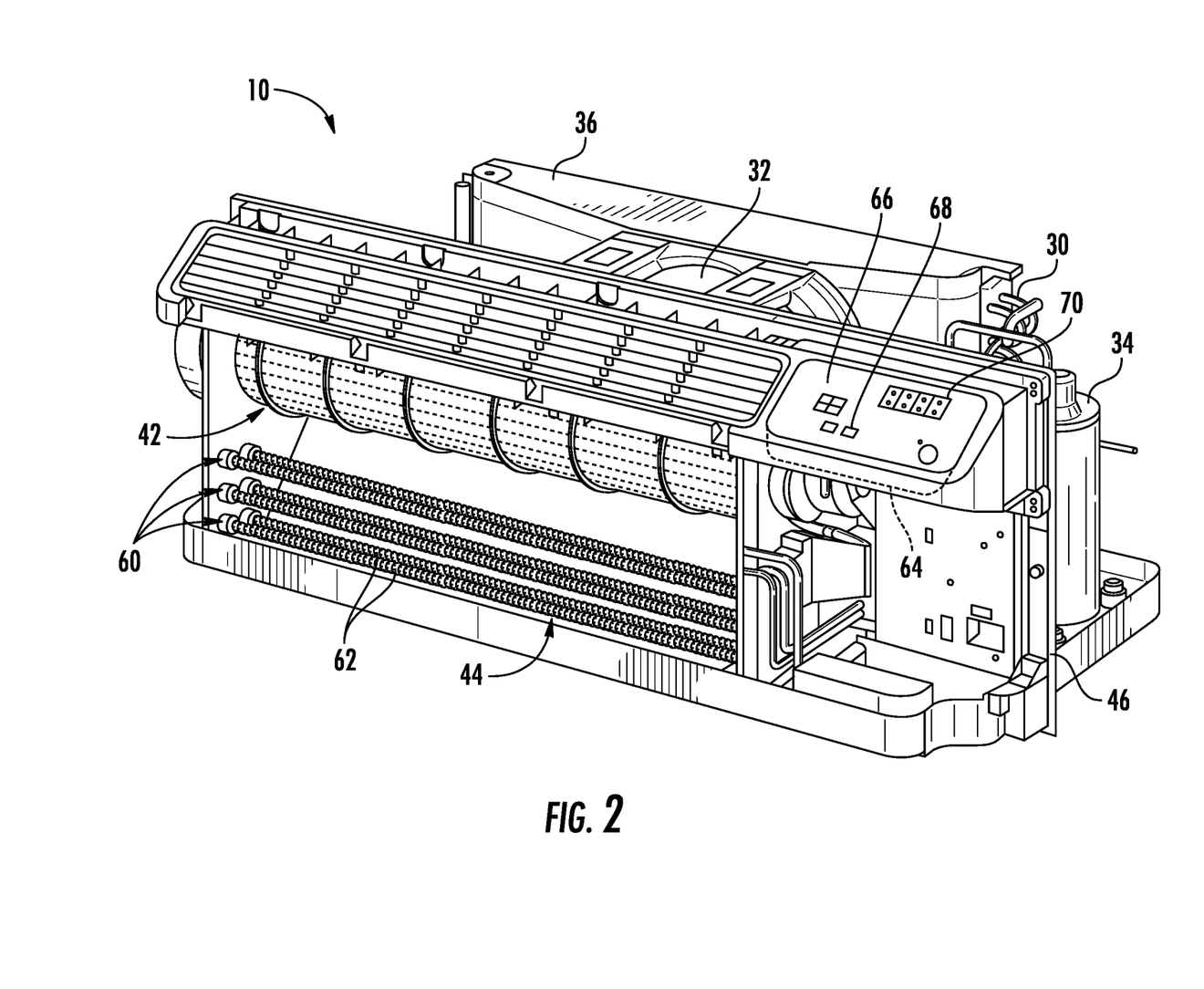
FIG. 2 is another front perspective view of the indoor portion of the exemplary air conditioner unit of FIG. 1.

Referring now to FIGS. 1 and 2, an air conditioner unit 10 is provided. The air conditioner unit 10 is a one-unit type air conditioner, also conventionally referred to as a room air conditioner or a packaged terminal air conditioner (PTAC). The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined. Although aspects of the present subject matter are described with reference to PTAC unit 10, it should be appreciated that aspects of the present disclosure may be equally applicable to other air conditioner unit types and configurations, such as single package vertical units (SPVUs) and split heat pump systems.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, and the room front 24 may be part of the indoor portion 12. Components of the outdoor portion 14, such as an outdoor heat exchanger 30, an outdoor fan 32, and a compressor 34 may be housed within the wall sleeve 26. A fan shroud 36 may additionally enclose outdoor fan 32, as shown.

Indoor portion 12 may include, for example, an indoor heat exchanger 40, a blower fan or indoor fan 42, and a heating unit 44. These components may, for example, be housed behind the room front 24. Additionally, a bulkhead 46 may generally support and/or house various other components or portions thereof of the indoor portion 12, such as indoor fan 42 and the heating unit 44. Bulkhead 46 may generally separate and define the indoor portion 12 and outdoor portion 14. According to some embodiments, indoor fan 42 is a variable speed fan, for example, a variable centrifugal blower or fan as illustrated, for example in FIG. 7.

Figure 3:
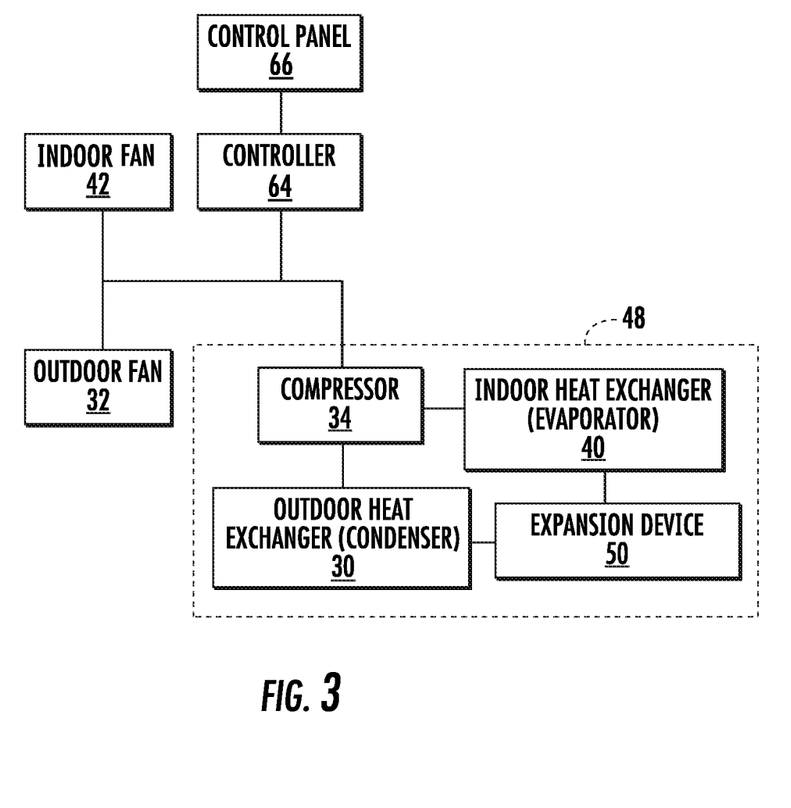
FIG. 3 is a schematic representation of a refrigeration loop in accordance with an embodiment of the present disclosure.

Outdoor and indoor heat exchangers 30, 40 may be components of a sealed system or refrigeration loop 48, which is shown schematically in FIG. 3. Refrigeration loop 48 may, for example, further include compressor 34 and an expansion device 50. As illustrated, compressor 34 and expansion device 50 may be in fluid communication with outdoor heat exchanger 30 and indoor heat exchanger 40 to flow refrigerant therethrough as is generally understood. The compressor 34 is configured to urge refrigerant to flow through the refrigeration loop 48 in a refrigeration cycle. More particularly, refrigeration loop 48 may include various lines for flowing refrigerant between the various components of refrigeration loop 48, thus providing the fluid communication there between. Refrigerant may thus flow through such lines from indoor heat exchanger 40 to compressor 34, from compressor 34 to outdoor heat exchanger 30, from outdoor heat exchanger 30 to expansion device 50, and from expansion device 50 to indoor heat exchanger 40. The refrigerant may generally undergo phase changes associated with a refrigeration cycle as it flows to and through these various components, as is generally understood. Suitable refrigerants for use in refrigeration loop 48 may include pentafluoroethane, difluoromethane, or a mixture such as R410a, although it should be understood that the present disclosure is not limited to such examples and rather that any suitable refrigerant may be utilized.

As is understood in the art, refrigeration loop 48 may be alternately operated as a refrigeration assembly (and thus perform a refrigeration cycle) or a heat pump (and thus perform a heat pump cycle). As shown in FIG. 3, when refrigeration loop 48 is operating in a cooling mode and thus performing a refrigeration cycle, the indoor heat exchanger 40 acts as an evaporator and the outdoor heat exchanger 30 acts as a condenser. Alternatively, when the assembly is operating in a heating mode and thus performs a heat pump cycle, the indoor heat exchanger 40 acts as a condenser and the outdoor heat exchanger 30 acts as an evaporator. The outdoor and indoor heat exchangers 30, 40 may each include coils through which a refrigerant may flow for heat exchange purposes, as is generally understood.

According to an exemplary embodiment, compressor 34 may be a variable speed compressor. In this regard, compressor 34 may be operated at various speeds depending on the current air conditioning needs of the conditioned space and the demand from refrigeration loop 48 as determined by controller 64. For example, according to an exemplary embodiment, compressor 34 may be configured to operate at any speed between a minimum speed, e.g., about 1500 revolutions per minute (RPM), to a maximum rated speed, e.g., about 6000 RPM. Notably, use of variable speed compressor 34 enables efficient operation of refrigeration loop 48 (and thus air conditioner unit 10), minimizes unnecessary noise when compressor 34 does not need to operate at full speed, and ensures a comfortable environment within the conditioned space. According to some embodiments, the compressor speed may be increased, or ramped up, from a first or minimum speed to a second, higher speed at a predetermined compressor ramp-up rate of, for example, about 100 RPM/minute. The second speed may be a maximum compressor speed, e.g., about 6000 RPM.

Specifically, according to an exemplary embodiment, compressor 34 may be an inverter compressor. In this regard, compressor 34 may include a power inverter, power electronic devices, rectifiers, or other control electronics suitable for converting an alternating current (AC) power input into a direct current (DC) power supply for the compressor. The inverter electronics may regulate the DC power output to any suitable DC voltage that corresponds to a specific operating speed of compressor. In this manner compressor 34 may be regulated to any suitable operating speed, e.g., from 0% to 100% of the full rated power and/or speed of the compressor. This may facilitate precise compressor operation at the desired operating power and speed, thus meeting system needs while maximizing efficiency and minimizing unnecessary system cycling, energy usage, and noise.

Figure 4:
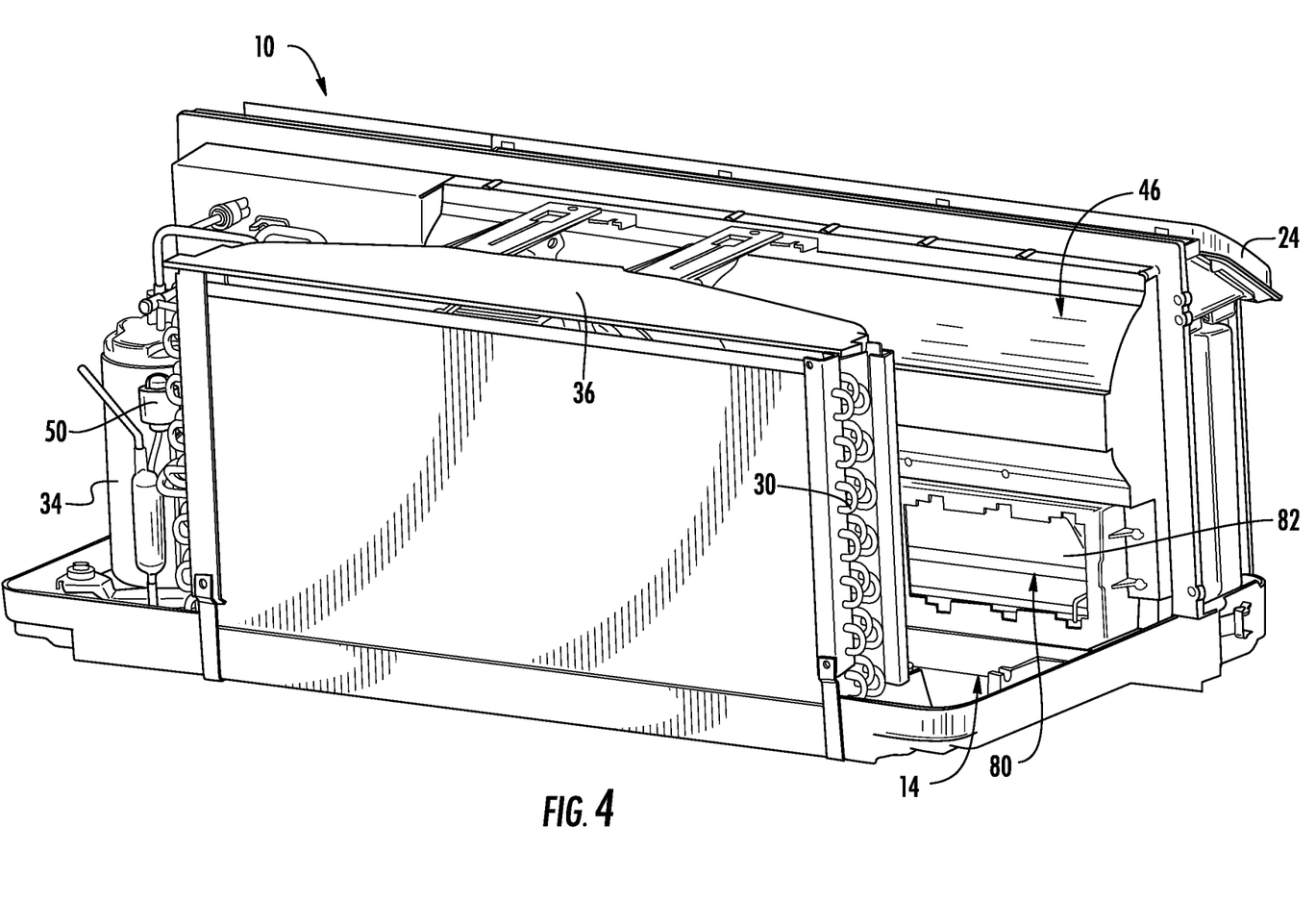
FIG. 4 is a rear perspective view of an outdoor portion of the exemplary air conditioner unit of FIG. 1 in accordance with an embodiment of the present disclosure.

In exemplary embodiments as illustrated in FIG. 4, expansion device 50 may be disposed in the outdoor portion 14 between the indoor heat exchanger 40 and the outdoor heat exchanger 30. According to the exemplary embodiment, expansion device 50 may be an electronic expansion valve ("EEV") that enables controlled expansion of refrigerant, as is known in the art. According to alternative embodiments, expansion device 50 may be a capillary tube or another suitable expansion device configured for use in a thermodynamic cycle.

More specifically, according to exemplary embodiments, electronic expansion device 50 may be configured to precisely control the expansion of refrigerant to maintain, for example, a desired temperature differential of the refrigerant across the evaporator (i.e., the outdoor heat exchanger 30 in heat pump mode). In other words, electronic expansion device 50 throttles the flow of refrigerant based on the reaction of the temperature differential across the evaporator or the amount of superheat temperature differential, thereby ensuring that the refrigerant is in the gaseous state entering compressor 34.

In general, the terms "superheat," "operating superheat," or the like are generally intended to refer to the temperature increase of the refrigerant in excess of the fully saturated vapor temperature in the evaporator. In this regard, for example, the superheat may be quantified in degrees Fahrenheit, e.g., such that 1° F. superheat means that the refrigerant exiting the evaporator is 1° F. higher than the saturated vapor temperature. It should be appreciated that the operating superheat may be measured and monitored by controller 64 in any suitable manner. For example, controller 64 may be operably coupled to a pressure sensor for measuring the refrigerant pressure exiting the evaporator, may convert that pressure to the saturated vapor temperature, and may subtract that temperature from the measured refrigerant temperature at the evaporator outlet to determine superheat.

According to exemplary embodiments, expansion device or electronic expansion valve 50 may be driven by a stepper motor or other drive mechanism to any desirable position between a fully closed position (e.g., when no refrigerant passes through EEV 50) to a fully open position (e.g., when there is little or no restriction through the EEV 50). For example, controller 64 may be operably coupled to EEV 50 and may regulate the position of the EEV 50 through a control signal to achieve a target superheat, a target restriction/expansion, etc.

More specifically, the control signal communicated from controller 64 may specify the number of control steps (or simply "steps") and a corresponding direction (e.g., counterclockwise toward the closed position or clockwise toward the open position). Each EEV 50 may have a physical stroke span equal to the difference between the fully open position and the fully closed position. In addition, the EEV 50 may include a step range or range of control steps that correspond to the number of adjustment steps it takes for the EEV 50 to travel from the fully closed position to the fully open position.

Each "step" may refer to a predetermined rotation of the drive mechanism, e.g., such as a stepper motor, which may in turn move the EEV 50 a fixed linear distance toward the open or closed position (depending on the commanded step direction). For example, according to the exemplary embodiment, the EEV 50 may have a step range of 500 steps, with 0 steps corresponding to fully closed and 500 steps corresponding to fully open. However, it should be appreciated that according to alternative embodiments, any given electronic expansion valve may include a different number of control steps, and the absolute step adjustments described herein may be varied accordingly.

In addition, as used herein, the position of EEV 50 may be expressed as a percentage, e.g., where 0% corresponds to a fully closed position and 100% corresponds to a fully open position. According to exemplary embodiments, this percentage representation may also refer to the percentage of total control steps taken from the closed position, e.g., with 10% referring to 50 steps (e.g., 10% of the 500 total steps) and 80% referring to 400 steps (e.g., 80% of 500 total steps).

According to the illustrated exemplary embodiment, outdoor fan 32 is an axial fan and indoor fan 42 is a centrifugal fan. However, it should be appreciated that according to alternative embodiments, outdoor fan 32 and indoor fan 42 may be any suitable fan type. In addition, according to an exemplary embodiment, outdoor fan 32 and indoor fan 42 are variable speed fans. For example, outdoor fan 32 and indoor fan 42 may rotate at different rotational speeds, thereby generating different air flow rates. It may be desirable to operate fans 32, 42 at less than their maximum rated speed to ensure safe and proper operation of refrigeration loop 48 at less than its maximum rated speed, e.g., to reduce noise when full speed operation is not needed. In addition, according to alternative embodiments, fans 32, 42 may be operated to urge make-up air into the conditioned space.

According to the illustrated embodiment, indoor fan 42 may operate as an evaporator fan in refrigeration loop 48 to encourage the flow of air through indoor heat exchanger 40. Accordingly, indoor fan 42 may be positioned downstream of indoor heat exchanger 40 along the flow direction of indoor air and downstream of heating unit 44. Alternatively, indoor fan 42 may be positioned upstream of indoor heat exchanger 40 along the flow direction of indoor air and may operate to push air through indoor heat exchanger 40.

Heating unit 44 in exemplary embodiments includes one or more heater banks 60. Each heater bank 60 may be operated as desired to produce heat under the control of controller 64. In some embodiments as shown, three heater banks 60 may be utilized. Alternatively, however, any suitable number of heater banks 60 may be utilized. Each heater bank 60 may further include at least one heater coil or coil pass 62, such as in exemplary embodiments two heater coils or coil passes 62. Alternatively, other suitable heating elements may be utilized.

The operation of air conditioner unit 10 including compressor 34 (and thus refrigeration loop 48 generally) indoor fan 42, outdoor fan 32, heating unit 44, expansion device 50, and other components of refrigeration loop 48 may be controlled by a processing device such as a controller 64 (e.g., FIG. 1). In some embodiments, control panel 66 may include or be in operative communication with one or more user input devices 68, such as one or more of a variety of digital, analog, electrical, mechanical, or electro-mechanical input devices including rotary dials, control knobs, push buttons, toggle switches, selector switches, and touch pads. Additionally, air conditioner unit 10 may include a display 70, such as a digital or analog display device generally configured to provide visual feedback regarding the operation of unit 10. For example, display 70 may be provided on control panel 66 and may include one or more status lights, screens, or visible indicators. According to exemplary embodiments, user input devices 68 and display 70 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Air conditioner unit 10 may further include or be in operative communication with a processing device or a controller 64 that may be generally configured to facilitate appliance operation. In this regard, control panel 66, user inputs 68, and display 70 may be in communication with controller 64 such that controller 64 may receive control inputs from user inputs 68, may display information using display 70, and may otherwise regulate operation of unit 10. In addition, controller 64 may receive signals sent or communicated by various sensors (e.g., mixed air temperature sensor 120 or mixed air humidity sensor 122) for storage in a memory location or processing in a processor. The processor 64 may communicate a response or instruction to the various systems within unit 10. For example, signals generated or communicated by controller 64 may operate unit 10, including any or all system components, subsystems, or interconnected devices, in response to the position of user input devices 68 and other control commands. Control panel 66 and other components of unit 10 may be in communication with controller 64 via, for example, one or more signal lines or shared communication busses. In this manner, Input/Output ("I/O") signals may be routed between controller 64 and various operational components of unit 10.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 64 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 64 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 64 may be operable to execute programming instructions or micro-control code associated with an operating cycle of unit 10. In this regard, the instructions may be software or any set of instructions that when executed by the processing device, cause the processing device to perform operations, such as running one or more software applications, displaying a user interface, receiving user input, processing user input, etc. Moreover, it should be noted that controller 64 as disclosed herein is capable of and may be operable to perform any methods, method steps, or portions of methods as disclosed herein. For example, in some embodiments, methods disclosed herein may be embodied in programming instructions stored in the memory and executed by controller 64.

The memory devices included or coupled to controller 64 may also store data that can be retrieved, manipulated, created, or stored by the one or more processors or portions of controller 64. The data can include, for instance, data to facilitate performance of methods described herein. The data can be stored locally (e.g., on controller 64) in one or more databases and/or may be split up so that the data is stored in multiple locations. In addition, or alternatively, the one or more database(s) can be connected to controller 64 through any suitable network(s), such as through a high bandwidth local area network (LAN) or wide area network (WAN). In this regard, for example, controller 64 may further include a communication module or interface that may be used to communicate with one or more other component(s) of unit 10, controller 64, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Figure 5:
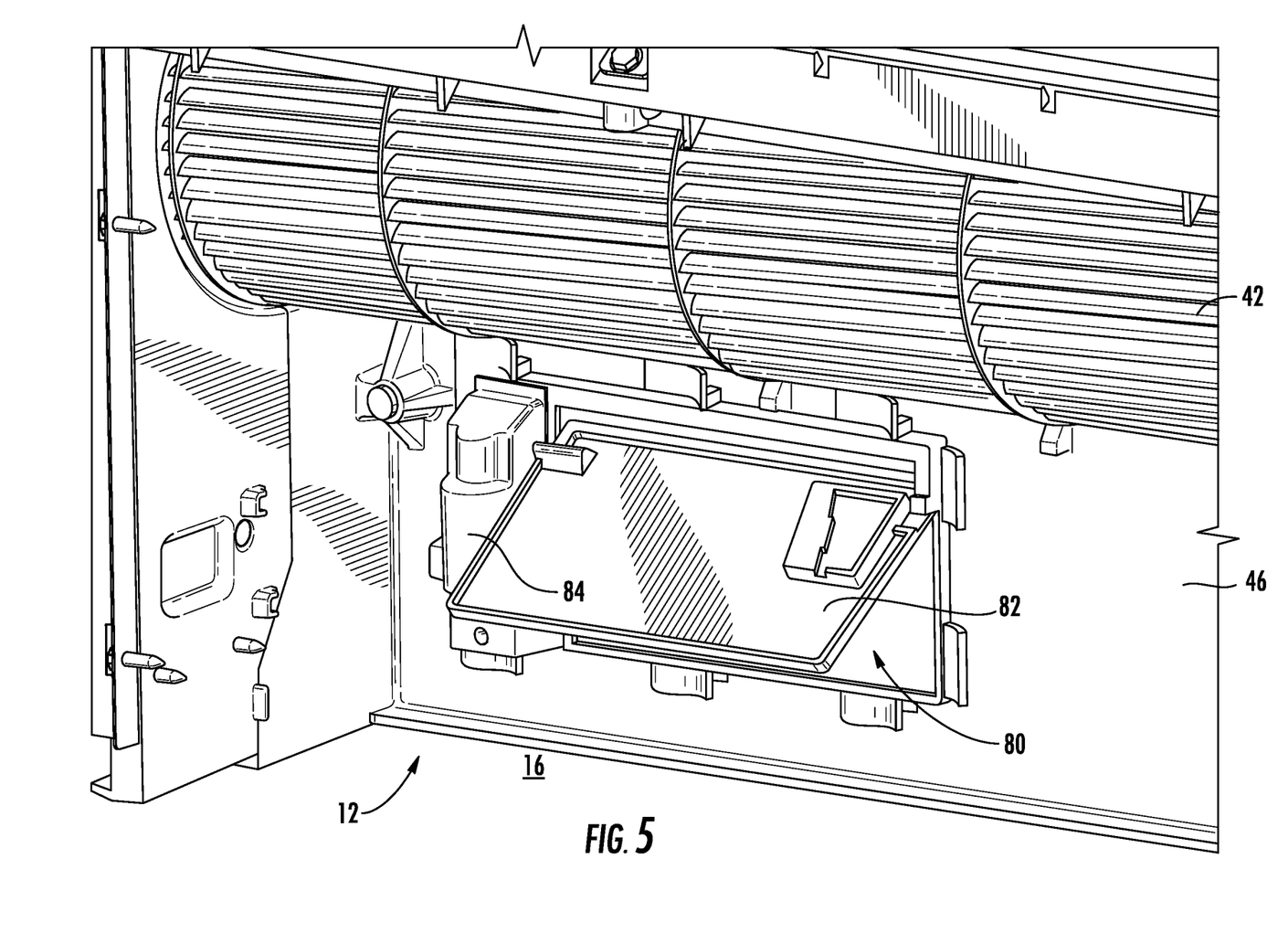
FIG. 5 is an enlarged front perspective view of a portion of the air conditioner unit of FIG. 4 in accordance with an embodiment of the present disclosure.

Referring to FIGS. 4 and 5, a vent aperture 80 may be defined in bulkhead 46 for providing fluid communication between indoor portion 12 and outdoor portion 14. In particular, vent aperture 80 fluidly couples the outside portion 14 with indoor fan 42 which is in fluid communication with the conditioned space. Vent aperture 80 may be utilized in an installed air conditioner unit 10 to allow outdoor air to mix with indoor air (i.e. recirculating indoor air) in the indoor fan 42, forming a mixed airflow 118 for discharge into the conditioned space through the discharge vent 112. In this regard, in some cases it may be desirable to allow fresh outside air (i.e., "make-up air" 116) to flow into the conditioned space in order, e.g., to meet government regulations, to compensate for negative pressure created within the conditioned space, etc. According to some embodiments, conditioning of the make-up air 116, for example dehumidification or cooling, before it is introduced to the conditioned space may be desirable. In some embodiments, the make-up air 116 is mixed with a recirculating flow of indoor air 114 before the flow of mixed air 118 is discharged into the conditioned space. In this manner, according to an exemplary embodiment, make-up air may be provided into the space through fan assembly 100 (described below), vent aperture 80, and discharge vent 112 as required or when desired, with a temperature and a humidity level similar, or substantially similar, to the conditioned space target or predetermined conditions.

As shown in FIG. 5, a vent door 82 may be pivotally mounted to the bulkhead 46 proximate to vent aperture 80 to open and close vent aperture 80. More specifically, as illustrated, vent door 82 is pivotally mounted to the indoor facing surface of bulkhead 46 and pivotable towards indoor portion 12. Vent door 82 may open to a plenum 16 formed at the indoor facing side of bulkhead 46. The auxiliary fan 102 urges a flow of outdoor make-up air 116 into the plenum 16 to combine with the recirculating flow of indoor air 114 to produce a mixed airflow 118 that is directed through the discharge vent 112 and into the conditioned space. The recirculating flow of indoor air 114 and the mixed airflow 118 are motivated to flow by the action of indoor fan 42.

Vent door 82 may be configured to pivot between a first, closed position (FIG. 4) where vent door 82 prevents air from flowing between outdoor portion 14 and plenum 16, and a second, open position where vent door 82 is in an open position (as shown in FIG. 5) and allows make-up air to flow into the plenum 16. According to the illustrated embodiment (FIG. 5), vent door 82 may be pivoted between the open and closed position by an electric motor 84 controlled by controller 64, or by any other suitable method. Other configurations of the vent aperture 80 and vent door 82 may be used to selectively control the flow of make-up air 116 into the plenum 16.

Figure 6:
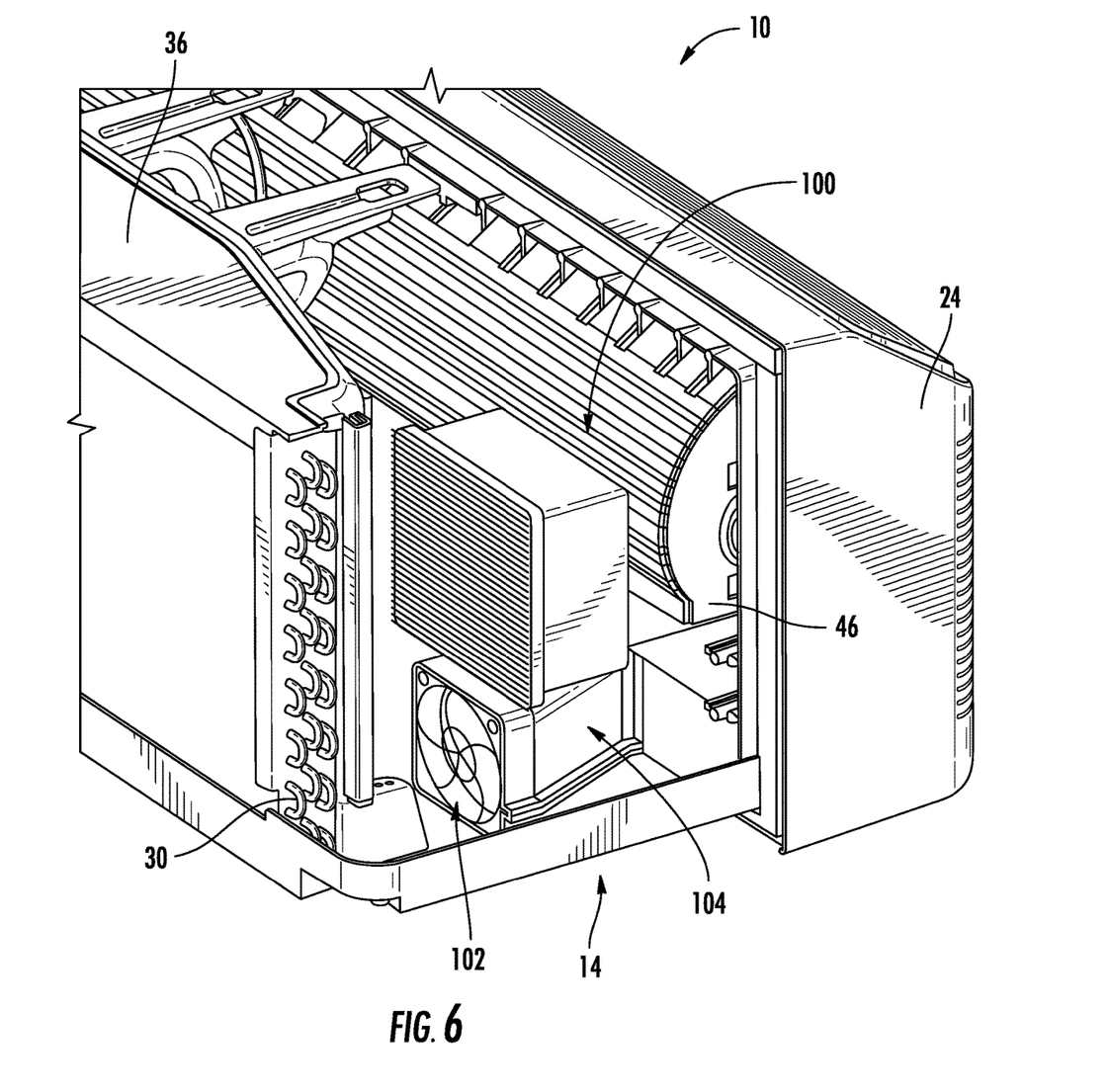
FIG. 6 is a rear perspective view of the exemplary air conditioner unit and bulkhead of FIG. 4 including a fan assembly for providing make-up air in accordance with an embodiment of the present disclosure.

Referring now to FIG. 6, a fan assembly 100 will be described according to an exemplary embodiment of the present subject matter. According to the illustrated embodiment, fan assembly 100 is generally configured for urging the flow of make-up air 116 through vent aperture 80 and into the plenum 16 for combination with the flow of indoor air 114 for discharge into a conditioned space without the assistance of an auxiliary sealed system. However, it should be appreciated that fan assembly 100 could be used in conjunction with a make-up air module including an auxiliary sealed system for conditioning the flow of make-up air. As illustrated in FIG. 6, fan assembly 100 includes one auxiliary fan 102 for urging a flow of make-up air through a fan duct 104, through vent aperture 80, to indoor fan 42. In other embodiments, more than one auxiliary fan 102 may be used.

According to the illustrated embodiment of FIG. 6, auxiliary fan 102 is an axial fan positioned at an inlet of fan duct 104, e.g., upstream from vent aperture 80. However, it should be appreciated that any other suitable number, type, and configuration of fan or blower could be used to urge a flow of make-up air according to alternative embodiments. In addition, auxiliary fan 102 may be positioned in any other suitable location within air conditioner unit 10 and auxiliary fan 102 may be positioned at any other suitable location within or in fluid communication with fan duct 104. The embodiments described herein are only exemplary and are not intended to limit the scope present subject matter.

Figure 7:
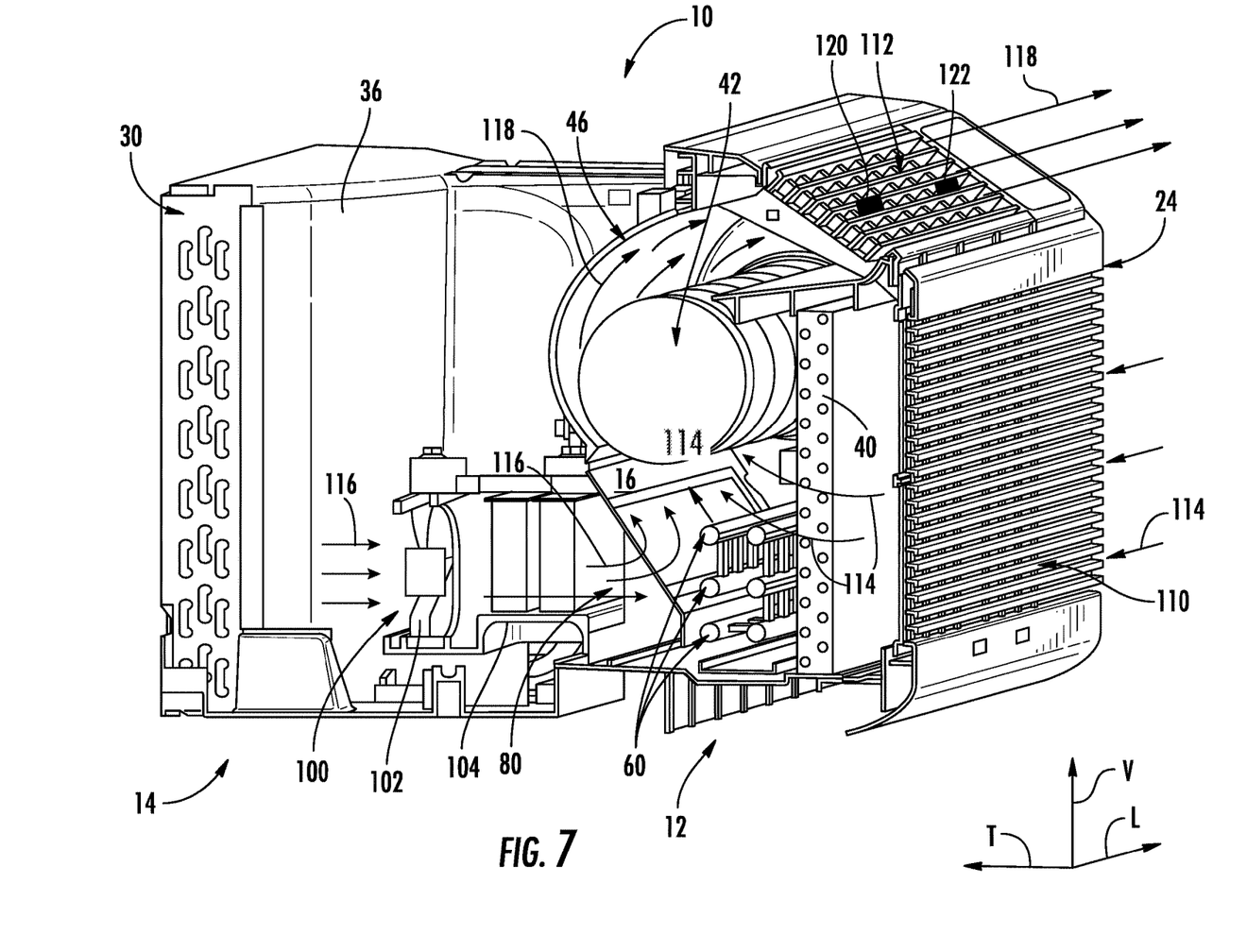
FIG. 7 is a side cross sectional view of the exemplary air conditioner unit of FIG. 1.

Referring now to FIG. 7, operation of unit 10 will be described according to an exemplary embodiment. More specifically, the operation of components within indoor portion 12 will be described during a cooling operation or cooling and dehumidifying cycle of unit 10. Although a cooling and dehumidifying cycle will be described, it should be further appreciated that indoor heat exchanger 40 and/or heating unit 44 may be used to heat indoor air according to alternative embodiments. Moreover, although operation of unit 10 is described below for the exemplary packaged terminal air conditioner (PTAC) unit, it should be further appreciated that aspects of the present subject matter may be used in any other suitable air conditioner unit, such as a heat pump or split unit system.

As illustrated, room front 24 of unit 10 generally defines an intake vent 110 and a discharge vent 112 for use in circulating a flow of indoor air (indicated by arrows 114) throughout a conditioned space. In this regard, indoor fan 42 is generally configured for drawing in indoor air 114 through intake vent 110 and urging the flow of air through indoor heat exchanger 40 before discharging the indoor air 114 out of discharge vent 112. According to the illustrated embodiment, intake vent 110 is positioned proximate to a bottom of unit 10 and discharge vent 112 is positioned proximate to a top of unit 10. However, it should be appreciated that according to alternative embodiments, intake vent 110 and discharge vent 112 may have any other suitable size, shape, position, or configuration.

During a cooling cycle, refrigeration loop 48 is generally configured for urging cold refrigerant through indoor heat exchanger 40 in order to lower the temperature of the flow of indoor air 114 before discharging it back into the conditioned space. In embodiments, the flow of indoor air 114 passes through the indoor heat exchanger 40 prior to being combined with outdoor air 116 to form a mixed airflow 118 that is discharged into the conditioned space. Specifically, during a cooling operation, controller 64 may be provided with a cooling target temperature, e.g., as set by a user for the desired room temperature. In general, components of refrigeration loop 48, outdoor fan 32, indoor fan 42, auxiliary fan 102 and other components of unit 10 operate to continuously cool the flow of air, until the target temperature is reached and the cooling cycle ceases. If the room temperature reaches an upper limit temperature, for example an offset from the cooling target temperature, the cooling cycle may begin again. In embodiments providing a flow of make-up air 116 to the conditioned space, for example using auxiliary fan 102, the auxiliary fan 102 may continuously operate independently of the cooling cycle.

In order to facilitate operation of refrigeration loop 48 and other components of unit 10 in a method in accordance with this disclosure, unit 10 may include a variety of sensors for detecting conditions of the discharge air 114 supplied to a conditioned space by the unit 10. These conditions can be fed to controller 64 which may make decisions regarding operation of unit 10 to rectify undesirable conditions or to otherwise condition the flow of mixed air 118 into the conditioned space. For example, as best illustrated in FIG. 7, unit 10 may include a temperature sensor 120 which is positioned in the discharge vent 112, within the flow of mixed air 118 and configured for detecting the temperature of the mixed air flow 118 supplied to the conditioned space. In addition, unit 10 may include a humidity sensor 122 which is positioned in the discharge airstream, i.e., the flow of mixed air 118, and configured for detecting the humidity of the mixed air 118 supplied to the conditioned space. The temperature and humidity sensors 120, 122 may be operatively connected to the controller 64 to communicate a temperature signal and a humidity signal proportional to the sensed temperature and humidity. Controller 64 may process the signals and operate the components of unit 10 to maintain a conditioned space with air conditions within a prescribed range. In this manner, unit 10 may be used to regulate the discharge flow of mixed air 118 provided to the conditioned space.

A dewpoint temperature, generally known to take into account air temperature and humidity level, may be used to characterize a comfortable level of humidity and temperature. The controller 64 may process the temperature signal from temperature sensor 120 and humidity signal from sensor 122 and determine the dewpoint of the flow of mixed air 118 discharged into the conditioned space. The determined dewpoint may then be compared to a target dewpoint temperature, or a range of dewpoint temperatures, corresponding to desired conditions in the conditioned space. The controller 64 can take corrective action, modifying the cooling cycle, to bring the dewpoint temperature of the mixed air stream 118 into conformity with the target, or target range, of dewpoint temperatures.

For example, during the cooling cycle, the indoor air flow 114 passing through the evaporator or indoor heat exchanger 40 is dehumidified as well as cooled. The humidity level in the conditioned space, along with the indoor air 114 temperature, may affect the perceived comfort level in the space.

When make-up air 116 is introduced to indoor air flow 114, the temperature and/or humidity level of the mixed air flow 118 may increase to an unacceptable level, particularly during off cycles of the cooling system, potentially leading to uncomfortable conditions in the conditioned space. By calculating and monitoring the dewpoint temperature, controller 64 may modify the cooling cycle to adjust the condition of the mixed air flow 118 to correspond with the desired room air characteristics.

As used herein, "temperature sensor" or the equivalent is intended to refer to any suitable type of temperature measuring system or device positioned in the discharge airstream of mixed air 118 for measuring the desired temperature. Thus, for example, temperature sensor 120 may be any suitable type of temperature sensor, such as a thermistor, a thermocouple, a resistance temperature detector, a semiconductor-based integrated circuit temperature sensor, etc. In addition, temperature sensor 120 may be positioned at any suitable location and may output a signal, such as a voltage, to controller 64 that corresponds to, or is proportional to, the temperature of the mixed airflow 118.

As used herein, the terms "humidity sensor" or the equivalent may be intended to refer to any suitable type of humidity measuring system or device positioned in the discharge air stream of mixed air 118 for measuring the desired humidity. Thus, for example, humidity sensor 122 may refer to any suitable type of humidity sensor, such as capacitive digital sensors, resistive sensors, and thermal conductivity humidity sensors. In addition, humidity sensor 122 may output a signal, such as a voltage, to controller 64 that corresponds to, or is proportional to, the humidity of the mixed airflow 118.

Figure 8:
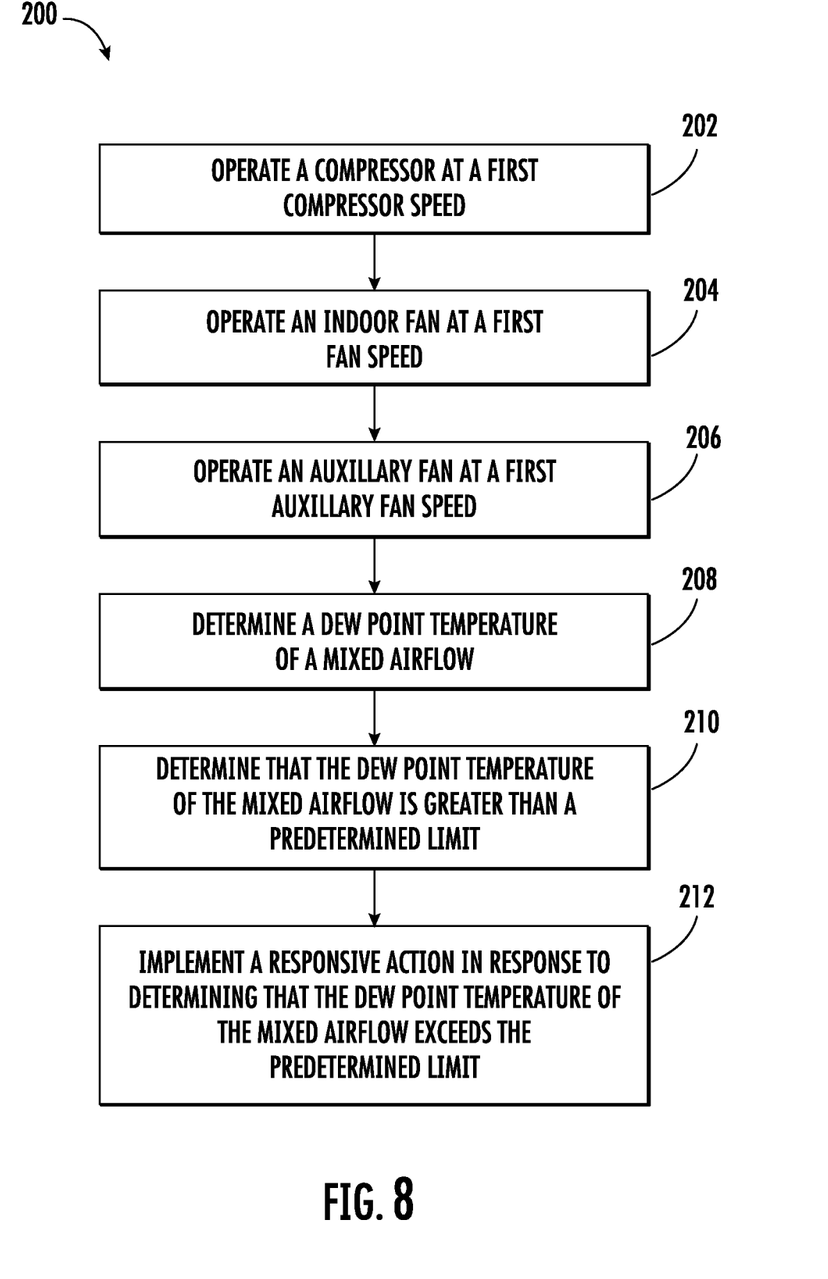
FIG. 8 illustrates a method of operating an air conditioner unit in accordance with an embodiment of the present disclosure.

Now that the construction of air conditioner unit 10 and the configuration of controller 64 according to exemplary embodiments have been presented, an exemplary method 200 of operating a packaged terminal air conditioner unit will be described. Referring to FIG. 8, method 200 includes, at step 202, operating a compressor in an air conditioner unit 10 at a first compressor speed. In this regard, continuing from the above example, the controller 64 is in operative communication with the compressor 34 and may operate the compressor 34 at a default speed measured in revolutions per minute (RPM). The default speed may have been determined or calculated to produce sufficient cooling capacity under a particular set of conditions. As above the compressor urges the flow of working fluid, or refrigerant, through the refrigeration loop 48 shown schematically in FIG. 3.

The method further includes, at step 204, operating an indoor fan 42 at a first fan speed. The indoor fan 42 is in operative communication with the controller 64 and may be initially operated at a default speed measured in revolutions per minute (RPM). The indoor fan 42 may be a variable speed fan operable at more than one speed, the fan speed provided at the instruction of the controller 64. Indoor fan 42 is operable to urge, or draw, a flow of indoor air 114 into intake vent 110 at the lower portion of the room front 24 of air conditioner unit 10. The indoor fan 42 further urges the flow of indoor air 114 across indoor heat exchanger 40 to cool and dehumidify the indoor air. The flow of indoor air 114 continues into the plenum 16 formed at the indoor facing side of the bulkhead 46 and which is in fluid communication with indoor fan 42. After passing through the plenum 16, the recirculating flow of indoor air 114 passes through the discharge vent 112 and into the conditioned space.

At 206, method 200 operates an auxiliary fan 102 at a first auxiliary fan speed to urge a flow of outdoor (make-up) air 116 to the plenum 16. According to some embodiments, auxiliary fan 102 may be a variable speed fan and may therefore provide various air flow rates of make-up air. In some embodiments, the auxiliary fan urges a continuous flow of make-up air into the plenum 16 regardless of the off/on status of the refrigeration loop 48. The auxiliary fan urges the flow of outdoor air, or make-up air, 116 to combine with the recirculating flow of indoor air 114 in the plenum 16 to produce a mixed airflow 118. The airflows (indoor air 114 and make-up or outdoor air 116) are combined together to form a mixed air flow having homogeneous properties, for example uniform temperature and humidity. The properties of the mixed air flow 118 may correspond with the target or set point properties selected for the conditioned space. The flow of mixed air 118 is discharged into the conditioned space through the discharge vent 112.

At 208, the controller 64 determines a dewpoint temperature of the flow of mixed air 118 at the point the flow of mixed air is discharged to the conditioned space. As above, the mixed air flow 118 is formed in the plenum 16 from a flow of make-up air 116 and a recirculating flow of indoor air 114 and mixed sufficiently to have uniform temperature and humidity properties. The controller 64 receives signals from the temperature sensor 120 and the humidity sensor 122 positioned in the discharge vent 112, adjacent to the conditioned space. The signals received by the controller 64 correspond to the temperature and humidity of the mixed air flow 118 (i.e., the discharge air stream) in the discharge vent 112. The controller 64 determines, for example by executing a stored algorithm, the dewpoint temperature from the temperature and humidity signals received. The dewpoint temperature of the flow of mixed air 118 may alternately be determined from a lookup chart stored in a memory location of the controller 64 using the temperature and humidity information received from sensors 120, 122.

At 210, the method determines that the dewpoint temperature of the mixed airflow of step 208 is greater than a predetermined limit. In this evaluation, the determined dewpoint temperature of step 208 is compared to a predetermined target dewpoint temperature or target range of dewpoint temperatures, for example the targets are saved at the controller 64. The target dewpoint temperature, or range of dewpoint temperatures, may be selected to yield a conditioned space with characteristics associated with certain air qualities deemed comfortable for a person present in the space. If the determined dewpoint temperature is less than or equal to the predetermined limit, no changes are made to the operating parameters of the air conditioner unit 10. In the case of the determined dewpoint temperature being greater than the predetermined limit, the method advances to step 212.

At step 212, controller 64 implements one or more responsive actions in response to the determination that the dewpoint temperature of the mixed airflow discharging into the conditioned space exceeds the predetermined limit. The out-of-range dewpoint temperature is recognized as a result of increased humidity in the flow of mixed air 118 caused by the introduction of the flow of make-up air 116. Accordingly, the responsive action is generally directed to decreasing the humidity in the mixed airflow 118. A first action in entering a dehumidification mode may include reducing the speed of indoor fan 42. As described above, the indoor fan 42 urges the flow of indoor air 114 across the indoor coil 40 acting as an evaporator. Reducing the fan speed from the first fan speed to a second fan speed consequently reduces the flow rate of the indoor air over the heat exchanger 40. At the second fan speed, the indoor air 114 is in contact with the indoor coil 40 for a longer period of time than when the fan is operating at the first fan speed. Accordingly, more humidity can be removed from the indoor air 114 before it is combined with the outdoor air 116 in the mixed air flow 118.

In some embodiments, the indoor fan speed is ramped down, that is changed over a period of time. The ramp-down speed reduction may provide a better user experience in the conditioned space and may reduce the likelihood of overshooting the target dewpoint temperature. The indoor fan ramp-down is achieved by decreasing the fan speed by a predetermined amount (i.e., reduced RPM) over a period of time, i.e., an indoor fan ramp-down rate. For example, in some embodiments, the predetermined indoor fan ramp-down rate may be about 25 revolutions per minute per minute (RPM/minute). As such, over an operating period of 1 minute, the indoor fan speed will decrease by 25 RPM. During the indoor fan ramp-down, the sensors 120, 122 continuously sense the air flow and report to the controller. As the determined dewpoint temperature is reduced and approaches the target dewpoint temperature, the indoor fan ramp-down rate may decrease, for example to 20 RPM/minute, or 15 RPM/minute, or 10 RPM/minute.

An indoor fan speed lower limit may be provided to avoid a fan speed of zero RPM, understood to be an unworkable condition. Accordingly, the controller 64 may limit the total effect of the ramp-down to a prescribed speed reduction, for example about 200 RPM. Accordingly, if the ramp-down results in a reduction of fan speed of about 200 RPM from the first fan speed, the controller ends the fan speed ramp-down. The indoor fan speed may remain at the reduced speed or may be returned to the first fan speed as a second responsive action is implemented.

In some embodiments, a second action taken by the controller 64 may be a reduction in the flow rate of outdoor air 116 by reducing the speed of auxiliary fan 102 to a second auxiliary fan speed. Decreasing the flow rate of outdoor air 116 may reduce the amount of humidity added to the indoor air 114 when forming the mixed air flow 118. Similar to the above, the auxiliary fan speed may be ramped down by decreasing the fan speed by a predetermined amount over a period of time, i.e., an auxiliary fan ramp-down rate. In some embodiments, an auxiliary fan speed of zero RPM may not be acceptable (e.g., if a continuous supply of outdoor air is required). In such cases, a predetermined minimum outdoor air flow rate, corresponding to a minimum auxiliary fan speed, may be set, such that the controller 64 will not reduce the auxiliary fan speed below a lower limit.

As a third action, the speed of the variable speed compressor 34 may be modified to provide greater cooling capacity at the indoor heat exchanger 40. Increasing the compressor speed (i.e., increasing the RPM of the compressor drive motor) may be used to increase the cooling capacity of the refrigeration loop 48 in general. With the increased cooling capacity may come an increase in dehumidification as well. Similar to the above with the change to the fan speed, the compressor speed may be ramped-up by a predetermined compressor ramp-up rate, i.e., a predetermined change is compressor speed over a period of time. For example, the controller may increase the drive speed of the compressor 34 by about 100 RPM per minute. Accordingly, for every minute of operation of the compressor, the compressor speed increases by 100 RPM.

During the ramp-up, the sensors 120, 122 are continuously sensing the air flow and reporting the temperature and humidity to the controller 64. As the determined dewpoint temperature of the mixed air flow 118 is reduced and approaches the target dewpoint temperature, the ramp-up rate may decrease, for example to 75 RPM/minute, or 50 RPM/minute, or 25 RPM/minute to avoid overshooting the target dewpoint temperature.

As generally understood, compressors have an upper limit to rotational speed. Accordingly, the controller 64 is monitoring the compressor speed during the ramp-up to ensure the compressor does not exceed a safe upper limit. For example, the controller 64 may end the compressor ramp-up at a compressor speed of about 6,000 RPM if the dewpoint temperature has not been sufficiently reduced. The upper limit of 6,000 RPM is an example only as some compressors have higher limits and others have lower limits.

As a fourth responsive action, separately from or in combination with the first and second responsive actions, the superheat target at the evaporator (or indoor coil 40) may be increased from a first superheat to a higher superheat target. This action may be achieved by adjusting a valve position of the expansion device 50, particularly an electronic expansion valve, from a first valve position to a second valve position, wherein the second valve position corresponds to a higher operating superheat than a superheat corresponding to the first valve position. The controller 64 may be in operable communication with a drive motor, for example a stepper motor, driving the electronic expansion valve to adjust the expansion valve in a suitable fashion. The electronic expansion valve may be adjustable between a fully closed position and a fully open position. Controller 64 is operable to determine the valve position is in a safe operating position as the valve is adjusted to increase the superheat.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An air conditioner unit comprising:
   a refrigeration loop comprising an evaporator and a condenser;
   a compressor operably coupled to the refrigeration loop and being configured to urge refrigerant through the refrigeration loop;
   an expansion device fluidly coupled to the refrigeration loop;
   an indoor fan operable to urge a flow of indoor air through the evaporator;
   an auxiliary fan operable to urge a flow of outdoor air to combine with the flow of indoor air to produce a mixed airflow, wherein the auxiliary fan is a variable speed fan; and
   a controller operably coupled to the compressor, the expansion device, the indoor fan, and the auxiliary fan, the controller being configured to:
   operate the compressor at a first compressor speed;
   operate the indoor fan at a first fan speed;
   operate the auxiliary fan at a first auxiliary fan speed;
   determine a dewpoint temperature of the mixed airflow;
   determine that the dewpoint temperature of the mixed airflow is greater than a predetermined limit; and
   implement a responsive action in response to determining that the dewpoint temperature of the mixed airflow exceeded the predetermined limit, wherein implementing the responsive action comprises decreasing a flow rate of the outdoor air by operating the auxiliary fan at a second auxiliary fan speed.

2. The air conditioner unit of claim 1, further comprising a temperature sensor and a humidity sensor in operable communication with the controller, wherein:
   the temperature sensor communicates a temperature signal corresponding to a temperature of the mixed airflow to the controller;
   the humidity sensor communicates a humidity signal corresponding to a humidity of the mixed airflow to the controller; and
   the controller determines the dewpoint temperature of the mixed airflow from the temperature signal and the humidity signal.

3. The air conditioner unit of claim 2, wherein the temperature sensor and the humidity sensor are positioned in a discharge air stream.

4. The air conditioner unit of claim 1, wherein implementing the responsive action comprises:
   decreasing a flow rate of the indoor air through the evaporator.

5. The air conditioner unit of claim 4, wherein:
   the indoor fan is a variable speed fan; and
   decreasing the flow rate of the indoor air through the evaporator comprises reducing the first fan speed to a second fan speed.

6. The air conditioner unit of claim 1, wherein the compressor is a variable speed compressor.

7. The air conditioner unit of claim 6, wherein implementing the responsive action comprises:
   increasing the compressor speed from the first compressor speed to a second compressor speed.

8. The air conditioner unit of claim 1, wherein the expansion device is an electronic expansion valve.

9. The air conditioner unit of claim 8, wherein implementing the responsive action comprises:
   adjusting a valve position of the electronic expansion valve from a first valve position to a second valve position, wherein the second valve position corresponds to a higher operating superheat than a superheat corresponding to the first valve position.

10. A method of operating an air conditioner unit comprising a refrigeration loop comprising an evaporator, a condenser, a compressor configured to urge refrigerant through the refrigeration loop, an expansion device, an indoor fan operable to urge a flow of indoor air over the evaporator, and an auxiliary fan operable to urge a flow of outdoor air to combine with the flow of indoor air to produce a mixed airflow, wherein the auxiliary fan is a variable speed fan, the method comprising:
    operating the compressor at a first compressor speed;
    operating the indoor fan at a first fan speed;
    operating the auxiliary fan at a first auxiliary fan speed;
    determining a dewpoint temperature of the mixed airflow;
    determining that the dewpoint temperature of the mixed airflow is greater than a predetermined limit; and
    implementing a responsive action in response to determining that the dewpoint temperature of the mixed airflow exceeded the predetermined limit, wherein implementing the responsive action comprises decreasing a flow rate of the outdoor air by operating the auxiliary fan at a second auxiliary fan speed.

11. The method of claim 10, wherein determining the dewpoint temperature of the mixed airflow comprises:
    receiving a temperature signal corresponding to a temperature of the mixed airflow;
    receiving a humidity signal corresponding to a humidity of the mixed airflow;

determining the dewpoint temperature of the mixed airflow from the temperature signal and the humidity signal.

12. The method of claim 11, wherein:
the temperature signal is received from a temperature sensor positioned in a discharge air stream; and
the humidity signal is received from a humidity sensor positioned in the discharge air stream.

13. The method of claim 10, wherein implementing the responsive action comprises decreasing a flow rate of the indoor air over the evaporator.

14. The method of claim 13, wherein:
the indoor fan is a variable speed fan; and
decreasing the flow rate of the indoor air through the evaporator comprises reducing the first fan speed to a second fan speed at a predetermined indoor fan ramp-down rate.

15. The method of claim 14, wherein:
the indoor fan ramp-down rate is about 25 revolutions per minute per minute; and
the second fan speed is no more than about 200 revolutions per minute less than the first fan speed.

16. The method of claim 10, wherein:
the compressor is a variable speed compressor; and
implementing the responsive action comprises increasing the compressor speed from the first compressor speed to a second compressor speed at a predetermined compressor ramp-up rate.

17. The method of claim 16, wherein:
the compressor ramp-up rate is about 100 revolutions per minute per minute; and
the second compressor speed is less than about 6,000 revolutions per minute.

18. The method of claim 10, wherein the expansion device is an electronic expansion valve and implementing the responsive action comprises adjusting a position of the electronic expansion valve from a first valve position to a second valve position, the second valve position corresponding to a higher superheat than a superheat corresponding to the first valve position.

* * * * *